H. VAN DYKEN.
FLUID EQUALIZING SUPPORT FOR VEHICLES.
APPLICATION FILED APR. 26, 1909.
956,455.
Patented Apr. 26, 1910.
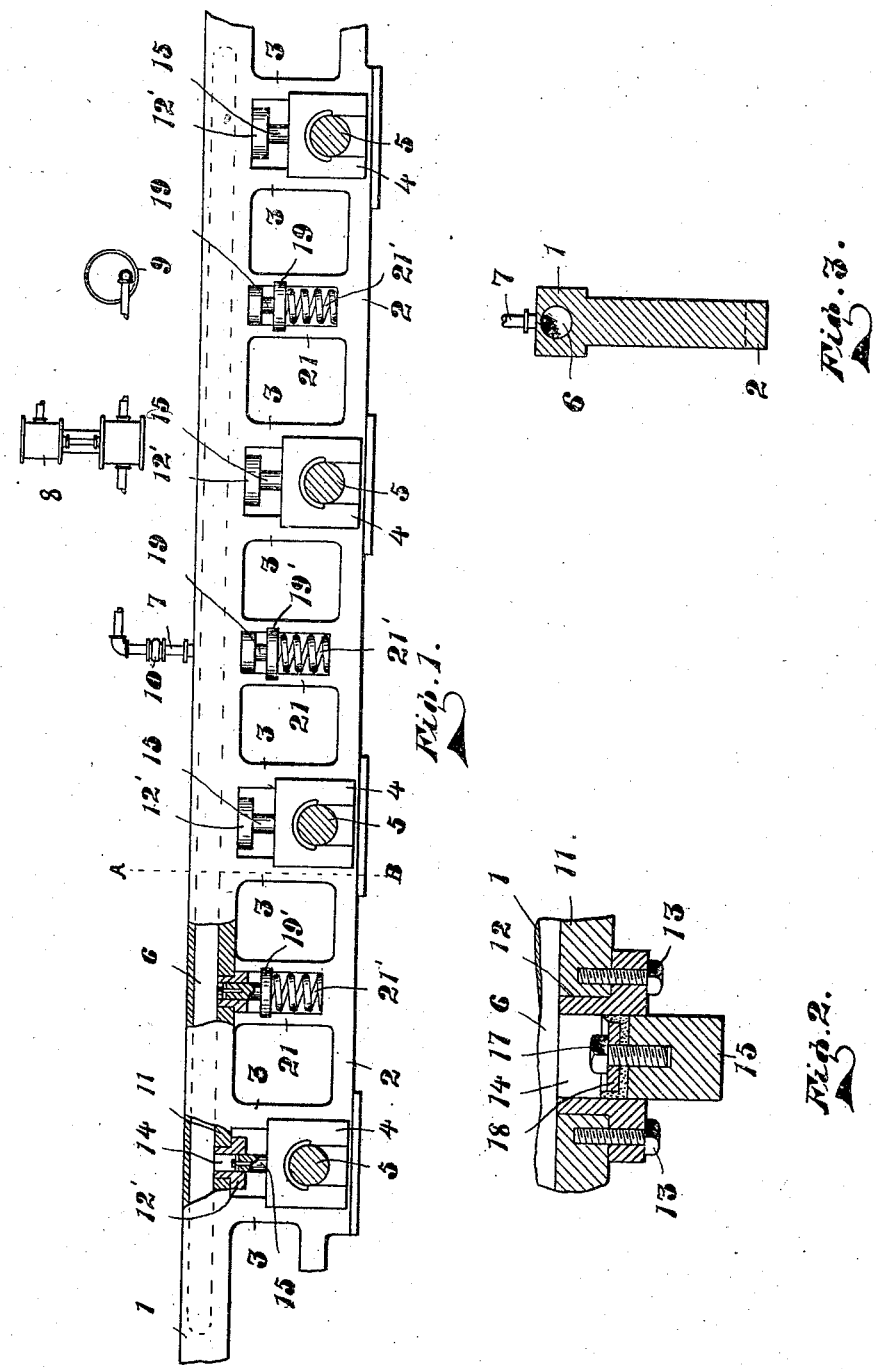
WITNESSES:
INVENTOR.
H. Van Dyken
BY
A. S. Pattison
ATTORNEY.

UNITED STATES PATENT OFFICE.

HARRY VAN DYKEN, OF TWO HARBORS, MINNESOTA.

FLUID-EQUALIZING SUPPORT FOR VEHICLES.

956,455.  Specification of Letters Patent.  Patented Apr. 26, 1910.

Application filed April 26, 1909. Serial No. 492,192.

*To all whom it may concern:*

Be it known that I, HARRY VAN DYKEN, a citizen of the United States, residing at Two Harbors, in the county of Lake and State of Minnesota, have invented certain new and useful Improvements in Fluid-Equalizing Supports for Vehicles, of which the following is a specification, reference being had therein to the accompanying drawing.

My invention relates to improvements in fluid equalizing supports for vehicles.

The object of my invention is to provide a flexible support for vehicles which is automatically equalizing in its effect upon the journals of the vehicles so that when one journal or bearing receives an abnormal load or thrust due to the vibration of the vehicle the compression of the fluid will be equally distributed throughout a number of the bearings and the strain locally relieved.

Another object of my invention is to provide a device of this character with a certain amount of elasticity to take a number of rapidly increased thrusts upon the bearings, as liquid is non-elastic.

Another object of my invention is to provide a more simple, cheap and effective structure to accomplish the above mentioned results.

In the accompanying drawings—Figure 1 is a side elevation of a locomotive driver frame equipped with my invention, showing a portion in broken section to better illustrate the working parts. Fig. 2 is an enlarged vertical sectional view showing the plunger connection between the oil chamber and the journal boxes. Fig. 3 is an enlarged vertical sectional view of the frame taken on the line A—B Fig. 1.

Referring now to the drawings, 1 represents the upper member of one side of a locomotive frame, and 2 the lower member spaced a distance apart vertically and united by means of the pedestal member 3 which may be of any desired number and in which are vertically mounted the journal boxes 4, in which are mounted the axles or shafts 5.

The upper member 1 of the frame is cored out or formed in any convenient manner and forming the longitudinal chamber 6 and in which the equalizing liquid is held. The liquid may be fed to said chamber automatically or as desired by the operator of the locomotive through the pipe 7 connected to a suitable pump 8, deriving its supply from a reservoir 9, and the pipe 7 having a suitable check valve 10 between the chamber 6 and the pump 8 to prevent backward pressure from the chamber and to also prevent any leakage. I have simply shown this form of supply as a convenient means if desired, though the invention will work equally as well if the liquid is applied in any other manner. It is also possible that the chamber 6 inside of the locomotive frame might be connected to the chamber in the opposite side of the frame to advantage, but such connection not being necessary to illustrate my invention and in such event the thrust on one bearing would be distributed to all the bearings on both sides of the locomotive.

The frame 1 has its lower wall 11 directly over the journal boxes between the pedestals and is provided with openings 12 communicating with the liquid chamber 6, and inserted within said openings are the plugs 12′ secured therein by the cap-screws 13. These caps are formed with a smooth bore 14 communicating with the liquid chamber 6, and having snugly fitted within said bore the pistons or plungers 15, upon the upper end of which is carried a suitable packing or gasket 16, held in place by the cap-screws 17 and the washer 18 and whereby a tight connection is formed with the bore 14 of the plug.

The plungers or pistons 15 are of a sufficient length to extend down and gear against the upper surface of the journal boxes 4 and thus it will be seen that if the chamber 6 is filled with a suitable liquid such as oil and the proper pressure applied by the pump, the frame will be normally retained in the position shown in Fig. 1 of the drawings. Any upward thrust of any one of the journal boxes 4 due to the vibration of the locomotive or irregularity in the track over which the locomotive is running will force the plunger or piston of that box upwardly, thus increasing the pressure of the oil within the chamber 6, and said pressure will be transmitted to all the plungers alike and the thrust of the said bearing equally divided among them all. By this construction it will be readily seen that any upward pressure on one bearing will not be received by the frame at that point, but will be distributed throughout the entire length of the frame.

Liquid being void of elasticity it has been found in practice that at times the thrusts are received very rapidly and which would cause a somewhat violent pounding throughout the liquid. In order to avoid this pounding I install between the pedestals a housing 21 in which is mounted a spring 21' the upper ends of the spring bearing against the enlarged ends 19' of the plungers 19. The plungers 19 move in the bores of the plugs in the same manner as the pistons or plungers 15, and the bores being in communication with the chamber 6. The springs 21 are sufficiently strong to keep the plunger 19 well up in place and the liquid at its normal pressure as before stated. It will be seen that if a sudden jar or thrust is transmitted to the liquid by any one of the journal plungers 15 it will be taken up by springs and transmitted to the locomotive, as the pressure of the liquid being increased by the thrust will force the piston 19 down against the spring and compress said spring. It is evident that any number of these relief springs may be used and they may be applied in a different manner from that shown in the drawings.

Having thus described my invention, what I claim is—

1. A liquid supporting device for vehicles, comprising a frame carrying a plurality of supporting cylinders in communication with one another, plungers communicating with the running gear of the locomotive and operating within said cylinders and elastic relief means communicating with the liquid supply.

2. A liquid supporting equalizer for vehicles, comprising side beams supporting the vehicle body and provided with a plurality of inverted cylinders, plungers carried by the running gear of the vehicle and operating in said cylinders, a pump or delivering fluid pressure to said cylinders, and means for controlling the feed of said fluid.

3. A liquid supporting equalizer for vehicles, comprising a frame carrying a plurality of inverted cylinders in communication with one another and in communication with a source of supply, plungers carried by the running gear of the vehicle and operating within said cylinders and elastic relief means in communication with said liquid.

4. A supporting device of the character described, comprising a frame, a plurality of supporting cylinders in communication with one another and supported by the frame, plungers in said cylinders, journal boxes within the frame and upon which the plungers rest and elastic relief means in communication with the said cylinders.

5. A supporting device of the character described, comprising a frame, a plurality of supporting cylinders in communication with one another and supported by the frame, plungers in said cylinders, vertically movable journal boxes within the frame and upon which the plungers bear, and elastic relief means in communication with the said cylinders.

6. A supporting device of the character described, comprising a frame, a plurality of supporting cylinders in communication with one another and supported by the frame, plungers in said cylinders, wheel supported journal boxes below said plungers, relief cylinders in communication with the supporting cylinders and spring pressed plungers in said relief cylinders.

7. A supporting device of the character described, comprising a frame, a plurality of supporting cylinders carried by the frame and in communication with one another, plungers in said cylinders, vertically movable journal boxes within the frame below the plungers and against which the plungers bear, relief cylinders carried by the frame and in communication with the supporting cylinders, and spring pressed plungers in said relief cylinders.

8. A supporting device of the character described, comprising a frame, a plurality of supporting cylinders carried by the frame and in communication with one another, means for supplying fluid pressure to the cylinders, plungers in said cylinders, vertically movable journal boxes within the frame below the plungers, and against which the plungers bear, relief cylinders carried by the frame and in communication with the supporting cylinders, and spring pressed plungers in said relief cylinders.

9. A supporting device of the character described, comprising side beams for supporting the vehicle body and having a horizontal chamber therein, a plurality of inverted cylinders in communication with said chamber, means for compressing the fluid within said chamber, plungers in said cylinders, vertically movable journal boxes in said frame and against which the plungers bear, relief cylinders carried by the frame and in communication with the chambers, and spring pressed plungers in said relief cylinders.

10. A supporting device of the character described, comprising side beams for supporting the relief body and having a horizontal chamber therein, a plurality of inverted cylinders supported by the side beams and in communication with the chamber, a pipe communicating with said chamber, means connected with the pipe for compressing the fluid within the chamber, plungers in said cylinders, vertically movable journal boxes carried by guides in the side beams below the plungers and against which the plungers bear, relief cylinders in communication with the chamber intermediate the first mentioned cylinders, plungers within said relief cylinders, and springs supported within guides carried by the beams and bearing against the relief plungers.

11. A supporting device of the character described, comprising side beams for supporting the relief body and having a horizontal chamber therein, a plurality of inverted removable cylinders supported by the under side of the upper portion of the side beams and in communication with the chamber, a pipe communicating with said chamber, means connected to the pipe for compressing the fluid within the chamber, plungers in said cylinders, vertically movable journal boxes carried by guides in said beams below the plungers and against which the plungers bear, relief cylinder removably secured in the beam intermediate the first mentioned cylinders, and springs supported within the beam and bearing against the relief plungers.

In testimony whereof I affix my signature in presence of two witnesses.

HARRY VAN DYKEN.

Witnesses:
NORMAN E. LA MOND,
S. GEO. STEVENS.